United States Patent
Ikeda et al.

(10) Patent No.: US 9,360,031 B2
(45) Date of Patent: Jun. 7, 2016

(54) FASTENING METHOD OF COMPOSITE MATERIAL PARTS

(75) Inventors: Yusuke Ikeda, Tokyo (JP); Toshiyuki Funato, Tokyo (JP); Takahiro Inagaki, Tokyo (JP); Mikio Nakamura, Tokyo (JP); Yosuke Ikeda, Tokyo (JP); Kunihiro Kuroi, Tokyo (JP); Akihito Suzuki, Tokyo (JP); Yuji Kondo, Tokyo (JP); Tsugumaru Yamashita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 196 days.

(21) Appl. No.: 14/112,320

(22) PCT Filed: Apr. 25, 2012

(86) PCT No.: PCT/JP2012/061150
§ 371 (c)(1),
(2), (4) Date: Oct. 17, 2013

(87) PCT Pub. No.: WO2012/147823
PCT Pub. Date: Nov. 1, 2012

(65) Prior Publication Data
US 2014/0047689 A1    Feb. 20, 2014

(30) Foreign Application Priority Data

Apr. 28, 2011    (JP) .................................. 2011-100643

(51) Int. Cl.
*B23Q 17/00*    (2006.01)
*F16B 5/02*    (2006.01)
(Continued)

(52) U.S. Cl.
CPC ................. *F16B 5/02* (2013.01); *B21J 15/142* (2013.01); *B21J 15/147* (2013.01); *B29C 65/562* (2013.01);
(Continued)

(58) Field of Classification Search
CPC ...... B29C 66/41; B29C 66/21; B29C 66/721; F16B 5/02; B21J 15/147; B21J 15/142; B21J 15/28; B29L 2031/3076
See application file for complete search history.

(56) References Cited

U.S. PATENT DOCUMENTS 3,748,948 A    7/1973    Schmitt
4,877,138 A    10/1989    Motiwala
(Continued)

FOREIGN PATENT DOCUMENTS

EP    1 903 221 A2    3/2008
JP    2007-203307    8/2007
(Continued)

OTHER PUBLICATIONS

International Search Report issued Aug. 7, 2012 in International (PCT) Application No. PCT/JP2012/061150.
(Continued)

*Primary Examiner* — Jacob Cigna
*Assistant Examiner* — Lee A Holly
(74) *Attorney, Agent, or Firm* — Wenderoth, Lind & Ponack, L.L.P.

(57) ABSTRACT

In a method of fastening composite material parts, a first smoothness of a first fastener is measured which is arranged to a first countersink through-hole which is formed in a first fastened work as stacked composite material parts. A second countersink depth is determined based on the first smoothness. A second countersink through hole with a second countersink depth is formed in a second fastened work as the composite material parts. The second fastened work is fastened using the second fastener arranged to the second countersink through-hole.

5 Claims, 10 Drawing Sheets

(51) Int. Cl.
*B21J 15/14* (2006.01)
*B29L 31/30* (2006.01)
*B29C 65/56* (2006.01)
*B29C 65/00* (2006.01)

(52) U.S. Cl.
CPC ............ *B29C 66/1122* (2013.01); *B29C 66/21* (2013.01); *B29C 66/41* (2013.01); *B29C 66/721* (2013.01); *B29L 2031/3076* (2013.01); *Y10T 29/49764* (2015.01)

(56) References Cited

U.S. PATENT DOCUMENTS

| | | | |
|---|---|---|---|
| 5,673,839 A * | 10/1997 | Howard et al. | 227/119 |
| 2008/0075555 A1 | 3/2008 | March et al. | |
| 2008/0209712 A1* | 9/2008 | Bisiach | 29/592 |
| 2009/0060666 A1 | 3/2009 | Georgeson et al. | |
| 2009/0126180 A1 | 5/2009 | Keener | |

FOREIGN PATENT DOCUMENTS

| | | |
|---|---|---|
| JP | 2008-75876 | 4/2008 |
| JP | 2009-144914 | 7/2009 |
| JP | 2010-537881 | 12/2010 |
| WO | 2007/068947 | 6/2007 |

OTHER PUBLICATIONS

International Preliminary Report on Patentability and Written Opinion of the International Searching Authority issued Oct. 29, 2013 in International (PCT) Application No. PCT/JP2012/061150.

Decision to Grant a Patent issued Nov. 26, 2014 in corresponding Japanese Patent Application No. 2011-100643 with partial English translation.

Extended European Search Report issued Dec. 18, 2014 in corresponding European Patent Application No. 12777026.1.

Chinese Decision to Grant a Patent issued Mar. 23, 2015 in corresponding Chinese Patent Application No. 201280020246.4 with partial English translation.

Canadian Notice of Allowance issued Feb. 22, 2016 issued in corresponding Canadian Patent Application No. 2,833,858.

\* cited by examiner

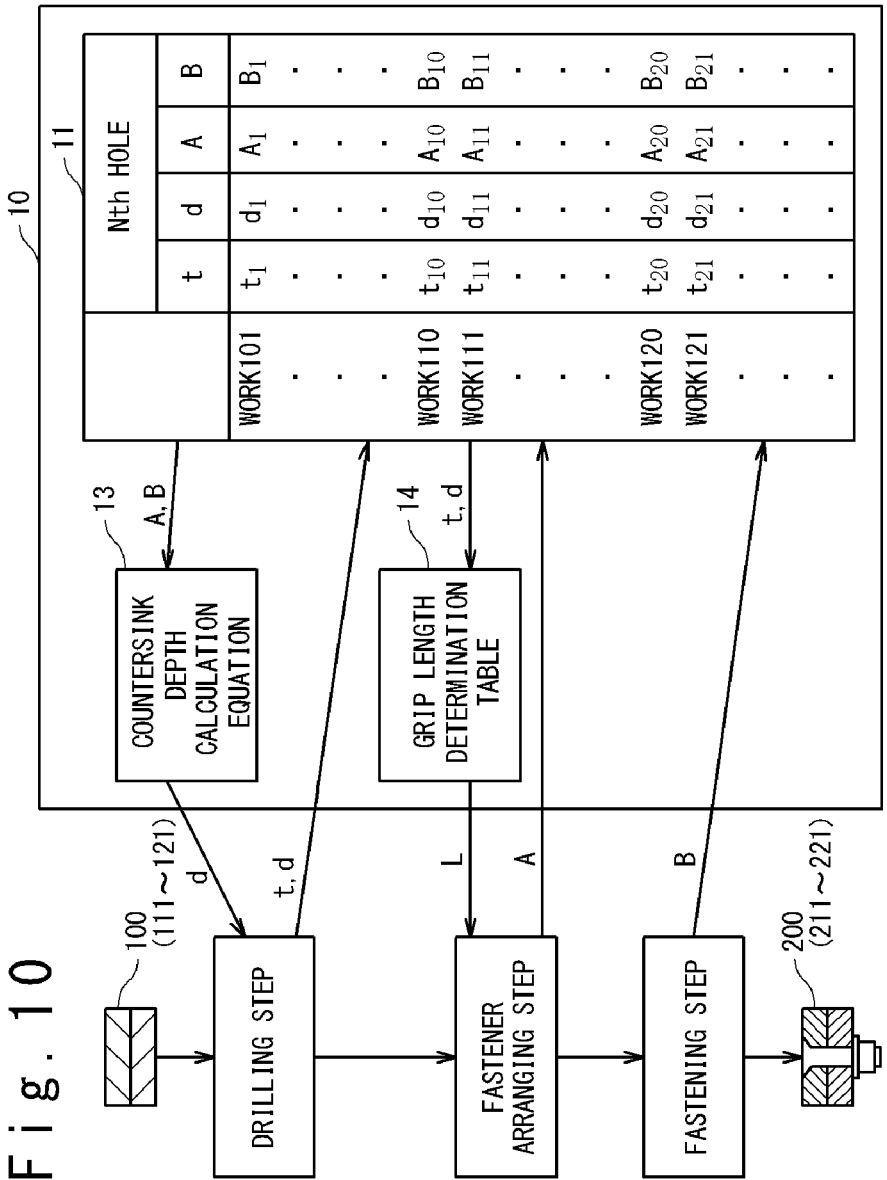

FASTENING METHOD OF COMPOSITE MATERIAL PARTS

TECHNICAL FIELD

The present invention is related to a fastening method of composite material parts by using a fastener such as a bolt and a rivet.

BACKGROUND ART

Patent Literature 1 (JP 2007-203307A) discloses a riveting machine which joins joined materials. The riveting machine controls a pushing quantity of a rivet into the joined material based on the board thicknesses of the joined materials. Thus, the surface of the rivet and the surface of the joined material are made flat.

FIG. 1 shows a fastened work 300 fastened with a fastener 420 and a nut 440. The fastener 420 contains a countersunk bolt. The fastened work 300 contains stacked composite material parts 351 and 352. A countersink through-hole 300a is formed in the fastened work 300 to pass from a surface 300b on the one side to a surface 300c on the other side. A countersink portion of the countersink through-hole 300a is arranged on the side of the surface 300b. The method of fastening the fastened work 300 contains disposing the fastener 420 to the countersink through-hole 300a and attaching the nut 440 to the fastener 420. Here, a smoothness B300 as a distance from the surface 300b to the head surface 421a of the fastener 420 in a direction of the countersink through-hole 300a is managed within a predetermined range. The smoothness B300 shows a recess or a protrusion of the head surface 421a from the surface 300b.

In recent years, a case where a composite material part such as fiber reinforced plastics is used instead of a metal part has increased. For example, many composite material parts have been used for an aircraft. When manufacturing the aircraft, the management of smoothness is especially important for the purpose of the reduction of air resistance.

CITATION LIST

[Patent literature 1] JP 2007-203307A

SUMMARY OF THE INVENTION

An inventor of the present invention recognizes as follows. That is, in the composite material, the crushing when receiving compression force is larger than metal. Therefore, when the parts 351 and 352 are the composite material parts, even if it is supposed that the thickness of fastened work 300 is measured before fastening with the nut 440, it is difficult to manage the smoothness B300 based on only the thickness. From the similar reason, when fastening the fastened work of the composite materials by using the rivet, it is difficult to manage the smoothness of the rivet based on only the thickness of the fastened work before fastening.

Therefore, an object of the present invention is to provide a fastening method which is easy to manage a smoothness of a fastener for fastening composite material parts.

A method of fastening composite material parts according to a first aspect of the present invention includes measuring a first smoothness of a first fastener arranged to a first countersink through-hole formed in a first fastened work as stacked composite material parts; determining a second countersink depth based on the first smoothness; forming a second countersink through-hole with the second countersink depth in a second fastened work as stacked composite material parts; and fastening the second fastened work by using the second fastener arranged to the second countersink through-hole.

Preferably, the above fastening method further includes: fastening the first fastened work by using the first fastener after measuring the first smoothness; and measuring the second smoothness of the first fastener, after fastening the first fastened work. The determining a second countersink depth includes determining the second countersink depth based on the first smoothness and the second smoothness.

Preferably, the above fastening method further includes: measuring a thickness of the second fastened work in a portion where the second countersink through-hole is to be formed; and selecting a second fastener based on the second countersink depth and the thickness.

Preferably, the determining a second countersink depth includes determining the second countersink depth by using a countersink depth calculation equation. The above fastening method includes: measuring a first smoothness of the second fastener arranged to the second countersink through-hole before fastening the second fastened work; measuring a second smoothness of the second fastener arranged to the second countersink through-hole after fastening the second fastened work; updating the countersink depth calculation equation based on the first smoothness and the second smoothness of the second fastener and the second countersink depth; determining a third countersink depth based on the updated countersink depth calculation equation; forming a third countersink through-hole with the third countersink depth in the third fastened work as stacked composite material parts; and fastening the third fastened work by using the third fastener arranged to the third countersink through-hole.

Preferably, the first fastener includes a first countersunk bolt. The second fastener includes a second countersunk bolt. The fastening the second fastened work includes attaching a nut to the second countersunk bolt.

According to the present invention, the fastening method is provided in which it is easy to manage the smoothness of the fastener for fastening the composite material parts.

BRIEF DESCRIPTION OF THE DRAWINGS

The above object, the other objects, the effect and the features of the present invention becomes clearer from the description of the embodiments in conjunction with the attached drawings:

FIG. 10 is a conceptual diagram showing the fastening method of the fastened work by using a grip length determination table in the fastening method according to a second embodiment of the present invention.

DESCRIPTION OF EMBODIMENTS

Hereinafter, a fastening method according to embodiments of the present invention will be described in detail with reference to the attached drawings.

[First Embodiment]

Figure 1:
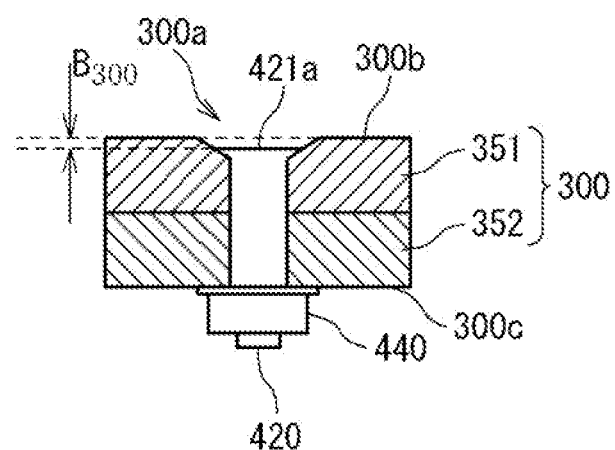
FIG. 1 is a sectional view of parts fastened with a fastener.
Figure 2:
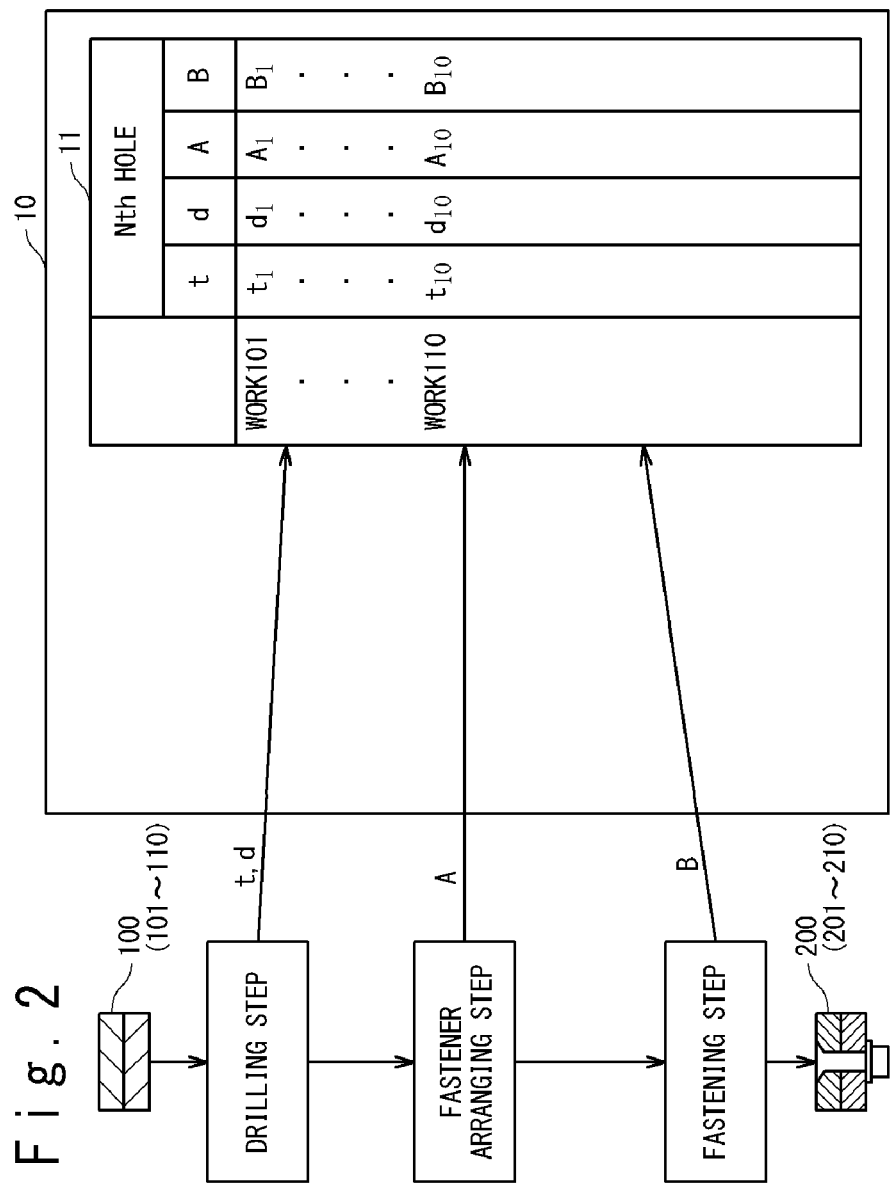
FIG. 2 is a conceptual diagram showing a database in a fastening method according to a first embodiment of the present invention.

Referring to FIG. 2, the fastening method according to a first embodiment of the present invention will be described. In the fastening method according to the present embodiment, a fastened work 200 is manufactured from a work 100 to be fastened through a drilling step, a fastener arranging step and a fastening step. In the drilling step, a plurality of countersink through-holes are formed in the work 100. In the fastener arranging step, a plurality of fasteners are arranged in the plurality of countersink through-holes, respectively. In the fastening step, a plurality of nuts are attached to the plurality of fasteners, respectively, and the work 100 is fastened. Hereinafter, an $N^{th}$ hole of the plurality of countersink through-holes will be described but that is same about the other holes.

In the drilling step, the thickness t of the work 100 and the depth d of a countersink portion are measured. In the fastener arranging step, a smoothness A is measured. In the fastening step, a smoothness B is measured.

Figure 3:
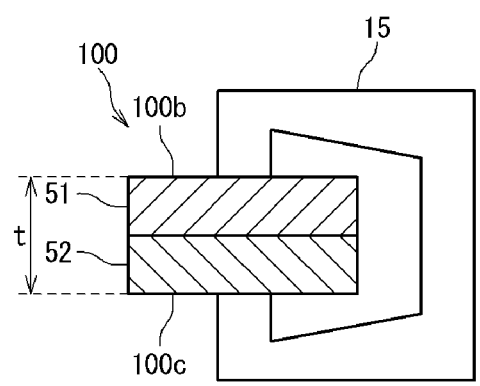
FIG. 3 is a sectional view of a fastened work showing a step of measuring the thickness of the fastened work in the fastening method according to the first embodiment.

Referring to FIG. 3, the measurement of thickness t in the drilling step will be described. The thickness t shows the thickness of the work 100 at a location where a countersink through-hole 100a is to be formed to be mentioned later. The work 100 contains a plurality of composite material parts 51 and 52. The thickness t of the work 100 is measured by bringing a thickness indicator 15 into contact with a surface 100b on the one side of the work 100 and a surface 100c on the other side of the work 100. The thickness t is measured before forming the countersink through-hole 100a in the work 100.

Figure 4:
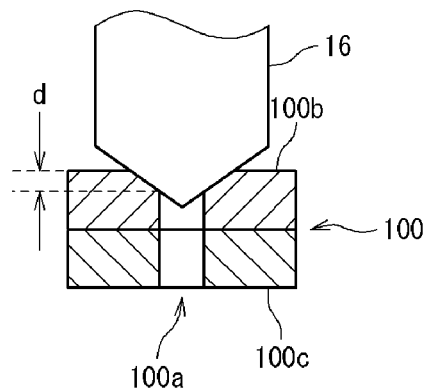
FIG. 4 is a sectional view of the fastened work showing a step of forming a countersink in the fastening method according to the first embodiment.

Referring to FIG. 4, the countersink through-hole 100a is formed in the drilling step to pass through the work 100 from the surface 100b to the surface 100c. The countersink through-hole 100a is the $N^{th}$ hole of the plurality of countersink through-holes which are formed in the work 100. The countersink portion of the countersink through-hole 100a is formed on the side of the surface 100b. The depth d of the countersink portion in the countersink through-hole 100a is determined. For example, the countersink depth d may be detected based on an actual feed amount of a countersink forming tool 16, may be calculated from an instruction value of the feed amount of the countersink forming tool 16, or may be measured by another method after the countersink through-hole 100a is formed.

Figure 5:
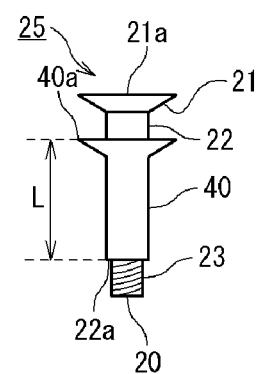
FIG. 5 is a diagram showing the fastener for fastening the fastened work in the fastening method according to the first embodiment.

Referring to FIG. 5, the fastener 25 for fastening the work 100 contains the countersunk bolt 20 and a sleeve 40. The countersunk bolt 20 has a head portion 21, a circular cylinder portion 22 and a thread portion 23. The head portion 21 has a head surface 21a. The circular cylinder portion 22 is a portion between the head portion 21 and the thread portion 23. Any thread is not formed in the circular cylinder portion 22. The sleeve 40 covers the circular cylinder portion 22. The axial distance of the fastener 25 between an end 40a of the sleeve 40 on the side near the head portion 21 and an end 22a on the side near the thread portion 23 of the sleeve 40 is called a grip length L of the fastener 25.

Figure 6:
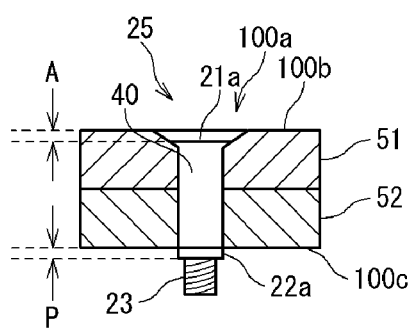
FIG. 6 is a sectional view showing the fastened work in which the fastener is arranged, in the fastening method according to the first embodiment.

Referring to FIG. 6, in the fastener arranging step, the fastener 25 is inserted in the countersink through-hole 100a, and the fastener 25 is beaten into the countersink through-hole 100a by using an air hammer and so on. In the state that the fastener 25 is arranged in or set to the countersink through-hole 100a, the head portion 21 is fit to the countersink portion of the countersink through-hole 100a so that the thread portion 23 protrudes from the surface 100c. After the fastener 25 is set to the countersink through-hole 100a, a smoothness A and a protrusion P are measured. The smoothness A is a distance from the surface 100b to the head surface 21a in an axial direction of the countersink through-hole 100a. The smoothness A shows a recess or protrusion of the head surface 21a from the surface 100b. The protrusion P is a distance from the surface 100c to the end 22a of the circular cylinder portion 22 in the axial direction of the countersink through-hole 100a. In order to attach a nut 30 to the thread portion 23 and to fasten the composite material parts 51 and 52, it is necessary that the protrusion P is within a predetermined range, to be mentioned later. It should be noted that when the protrusion P is not within the predetermined range, the fastener 25 is taken off and a new fastener 25 having a different grip length L is set to the countersink through-hole 100a.

Figure 7:
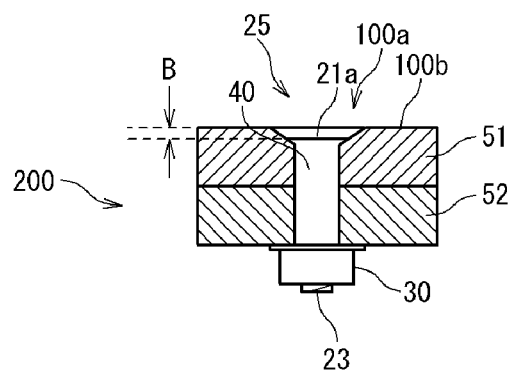
FIG. 7 is a diagram showing the fastened work as a resultant work in the fastening method according to the first embodiment.

Referring to FIG. 7, in the fastening step, a nut 30 is attaches to the thread portion 23 to fasten the composite material parts 51 and 52 so as to manufacture the fastened work 200. After the fastening, a smoothness B is measured. The smoothness B is a distance from the surface 100b to the head surface 21a in the countersink through-hole 100a. The smoothness B shows a recess or a protrusion of the head surface 21a from the surface 100b. The smoothness B must be managed within a predetermined range. Here, the composite material parts 51 and 52 are fastened through the attachment of the nut 30 to the fastener 25 and are crushed. As a result, the head surface 21a is dragged into the countersink through-hole 100a. A difference (B−A) between the smoothness B and the smoothness A is defined as a retraction Δt of the fastener 25.

Referring to FIG. 2, each of the works 101 to 110 is represented by the work 100. Each of the fastened works 201 to 210 is represented by the fastened work 200. The fastened works 201 to 210 are manufactured from the works 101 to 110 through the drilling step, the fastener arranging step and the fastening step. At this time, a database 11 is configured to be stored in a computer 10. As for the $N^{th}$ hole of the work 101, the thickness t, the countersink depth d, the smoothness A, and the thickness t1 as the smoothness B, the countersink depth d1, the smoothness A1 and the smoothness B1 are measured, respectively. As for the works 102 to 110, the measurement is carried out in the same way to contain the thicknesses t2 to t10, the countersink depths d2 to d10, the smoothnessses A2 to A10 and the smoothnesses B2 to B10. The database 11 is configured to contain the thicknesses t1 to t10, the countersink depths d1 to d10, the smoothnesses A1 to A10 and the smoothnesses B1 to B10 for the $N^{th}$ holes. In this way, data is managed for every hole in the database 11.

Figure 8:
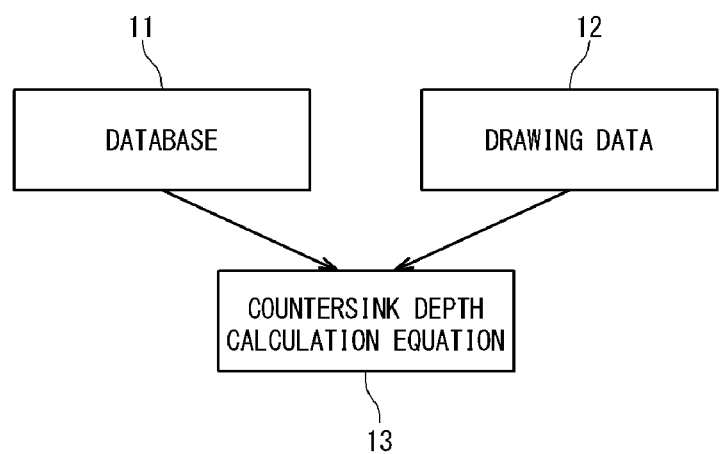
FIG. 8 is a conceptual diagram showing a step of determining a countersink depth calculation equation in the fastening method according to the first embodiment.

Referring to FIG. 8, in the fastening method according to the present embodiment, the countersink depth calculation equation 13 for the $N^{th}$ hole is determined based on the database 11 and the drawing data 12 of the fastened work 200. Here, the drawing data 12 are data which specifies the size of the fastened work 200 and so on. For example, the countersink depth calculation equation 13 is determined based on the countersink depths d1 to d10, the smoothnesses A1 to A10 and the smoothnesses B1 to B10. The countersink depth calculation equation 13 is an equation to determine the countersink depth d of the current work 100 (the work which is fastened later) from the smoothnesses A and B of the previous work 100 (work fastened previously) such that the smoothness B of the current work 100 is within a predetermined range. The countersink depth d can be determined in consideration of retraction Δt in advance by using the countersink depth calculation equation 13.

Figure 9:
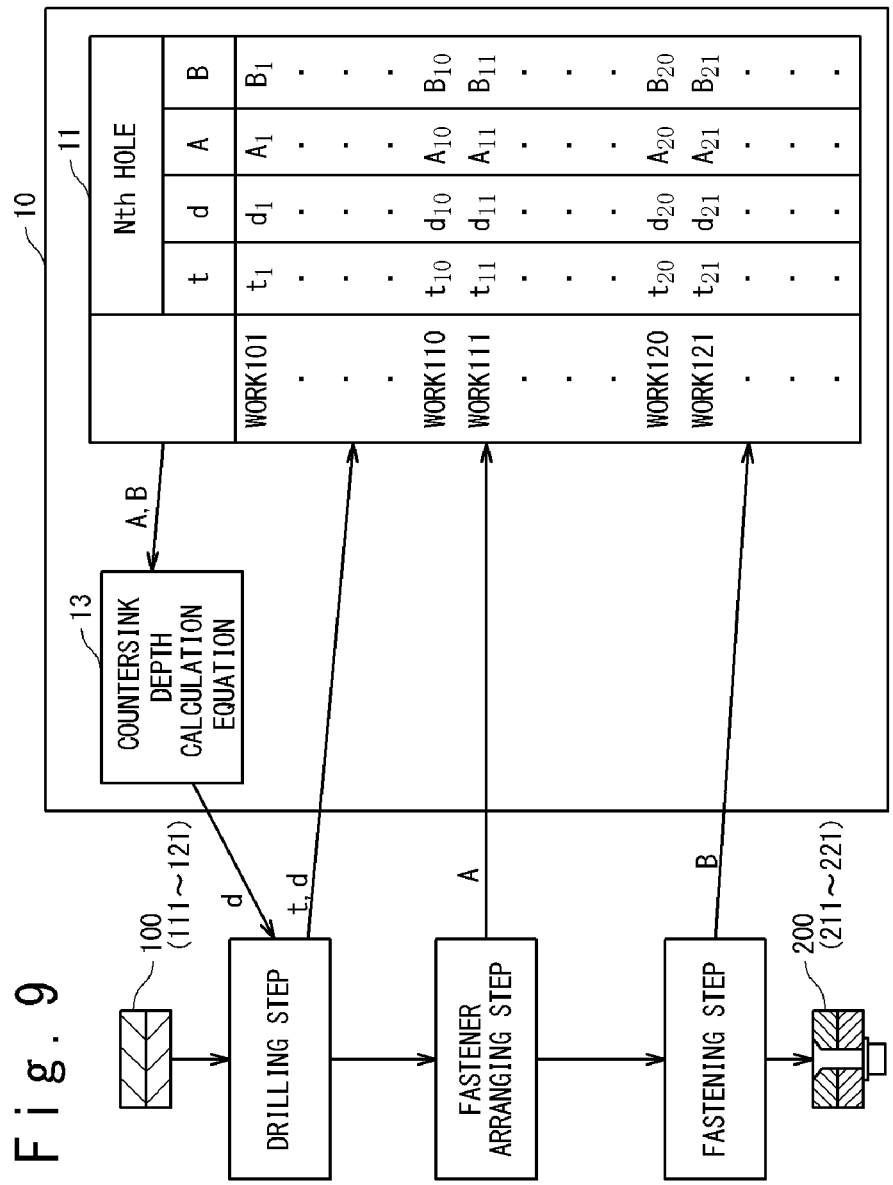
FIG. 9 is a conceptual diagram showing the fastening method of the fastened work by using the countersink depth calculation equation in the fastening method according to the first embodiment.

Referring to FIG. 9, the method of manufacturing the fastened works 211 to 221 from the works 111 to 121 by using the countersink depth calculation equation 13 will be described. Each of the works 111 to 121 is represented by the work 100. Each of the fastened works 211 to 221 is represented by the fastened work 200. The fastened works 211 to 221 are manufactured from the works 111 to 121 through the drilling step, the fastener arranging step and the fastening step. The method of manufacturing the fastened works 211 to 221 from the works 111 to 121 by using the countersink depth calculation equation 13 is the same as the method described with reference to FIG. 2 to FIG. 7 except for the following description. In order to use in the drilling step of the work 111, the computer 10 determines the countersink depth d11 from the smoothnesses A10 and B10 by using the countersink depth calculation equation 13 and outputs the countersink depth d11. In the drilling step of the work 111, the countersink through-hole 100a having the countersink depth of d11 is formed. The thickness t11, the countersink depth d11, the smoothness A11 and the smoothness B11 of the work 111 are measured and added to the database 11. In case of the works 112 to 221, the countersink depths d12 to d21 are determined from the smoothnesses A and B of the previous work by using the countersink depth calculation equation 13 and the countersink through-hole 100a having the countersink depths d12 to d21 are formed, like the work 111. Moreover, the thicknesses t12 to t21, the countersink depths d12 to d21, the smoothnesses A12 to A21 and the smoothnesses B12 to B21 of the work 112 to 221 are measured and added to the database 11.

According to the present embodiment, because the countersink depth d of the current work 100 is determined based on the smoothnesses A and B of the previous work 100, it is easy to manage the smoothness B of the current work 100 to fall within the predetermined range.

Instead of determining the countersink depth d21 of the work 121 from the smoothness A20 and the smoothness B20, the countersink depth d21 of the work 121 may be determined from an average of the smoothnesses A11 to A20 and an average of the smoothnesses B11 to B20. By determining the countersink depth d of the countersink through-hole 100a which should be formed to the current work 100 by using the data of the plurality of works 100, it can be prevented that the smoothnesses A and B of the work 100 influence the determining of the countersink depth d of the current work 100 greatly, when only one work 100 exists to show an extraordinary retraction Δt.

It should be noted that if a correlation can be found between the smoothness A and the smoothness B, the countersink depth calculation equation 13 is determined so that the countersink depth d can be determined from only the smoothness A, and the countersink depth d of the current work 100 is desirably determined from the smoothness A of the previous work 100 by using the countersink depth calculation equation 13. In this way, the drilling step to the current work 100 can be carried out before the fastening step of the previous work 100 is completed.

[Second Embodiment]

The fastening method according to a second embodiment of the present invention is the same as the fastening method according to the first embodiment except for the following description.

Referring to FIG. 10, the method of manufacturing the fastened works 211 to 221 from the works 111 to 121 by using a grip length determining table 14 will be described. The grip length determining table 14 is a table to determine the grip length L of the fastener 25 used to fasten the work 100 from thickness t and the countersink depth d in the work 100 so that the protrusion P of the work 100 falls within a predetermined range. In order to use in the fastener arranging step of the work 111, the computer 10 determines the grip length L from the thickness t11 and the countersink depth d11 by using the grip length determining table 14. In the fastener arranging step of the work 111, the fastener 25 having the determined grip length L is selected and the selected fastener is arranged to the countersink through-hole 100a of the work 111. In case of the works 112 to 121, the fastener 25 to be arranged to the countersink through-hole 100a of each of the works 112 to 121 is selected like the work 111.

According to the present embodiment, the protrusion P can be surely fallen within the predetermined range. Therefore, change of the fastener 25 arranged to the countersink through-hole 100a to another fastener 25 becomes unnecessary.

It should be noted that in the first embodiment and second embodiment, the countersink depth calculation equation 13 may be updated based on the data obtained after the determining of the countersink depth calculation equation 13 (for example, the countersink depths d11 to d15, the smoothnesses A11 to A15 and the smoothnesses B11 to B15 in the works 111 to 115), and the countersink depth d21 of the work 121 may be determined by using updated countersink depth calculation equation 13. By doing in this way, it is possible to reflect the latest data to the countersink depth calculation equation 13.

Although the fastening method of the present invention has been described with reference to the above embodiments, the present invention is not limited to the above embodiments. Various modifications to the above embodiments are contained in the present invention. For example, the present invention may be applied to a fastening method using rivets.

Although the present invention has been described with reference to the above embodiments, the present invention is not limited to the above embodiments. Various modifications to the above embodiments are contained in the present invention. The above embodiments can be combined with each other.

This application claims a priority based on Japanese Patent Application JP 2011-100643 filed on Apr. 28, 2011. The disclosure thereof is incorporated herein by reference.

The invention claimed is:

1. A fastening method of composite material parts, comprising:
    measuring a first smoothness of a first fastener arranged in a first countersink through-hole formed in a first work to be fastened as stacked composite material parts before fastening the first fastener, the first smoothness being a distance between a surface of the first work and a head surface of the first fastener in an axial direction of the first countersink through-hole;
    determining a second countersink depth based on the first smoothness which is measured before fastening the first fastener;

forming a second countersink through-hole with the second countersink depth in a second work to be fastened as stacked composite material parts; and fastening the second work by using a second fastener arranged in the second countersink through-hole.

2. A fastening method of composite material parts, comprising:

measuring a first smoothness of a first fastener arranged in a first countersink through-hole formed in a first work to be fastened as stacked composite material parts before fastening the first fastener, the first smoothness being a distance between a surface of the first work and a head surface of the first fastener in an axial direction of the first countersink through-hole;

fastening the first work with the first fastener after measuring the first smoothness;

measuring a second smoothness of the first fastener after fastening the first work, the second smoothness being a distance between the surface of the first work and the head surface of the first fastener in the axial direction of the first countersink through-hole;

determining a second countersink depth based on both the first smoothness and the second smoothness;

forming a second countersink through-hole with the second countersink depth in a second work to be fastened as stacked composite material parts; and fastening the second work by using a second fastener arranged in the second countersink through-hole.

3. The fastening method according to claim 1, further comprising:

measuring a thickness of the second work in a portion where the second countersink through-hole is to be formed; and selecting the second fastener based on the second countersink depth and the measured thickness.

4. A fastening method of composite material parts, comprising:

measuring a first smoothness of a first fastener arranged in a first countersink through-hole formed in a first work to be fastened as stacked composite material parts before fastening the first fastener, the first smoothness being a distance between a surface of the first work and a head surface of the first fastener in an axial direction of the first countersink through-hole;

determining a second countersink depth based on the first smoothness which is measured before fastening the first fastener by using a countersink depth calculation equation;

forming a second countersink through-hole with the second countersink depth in a second work to be fastened as stacked composite material parts;

fastening the second work by using a second fastener arranged in the second countersink through-hole;

measuring a first smoothness of the second fastener arranged in the second countersink through-hole before fastening the second work, the first smoothness of the second fastener being a distance between a surface of the second work and a head surface of the second fastener in an axial direction of the second countersink through-hole;

measuring a second smoothness of the second fastener arranged in the second countersink through-hole after fastening the second work, the second smoothness of the second fastener being a distance between a surface of the second work and the head surface of the second fastener in the axial direction of the second countersink through-hole;

updating the countersink depth calculation equation based on the first smoothness and the second smoothness of the second fastener, and the second countersink depth;

determining a third countersink depth based on the updated countersink depth calculation equation;

forming a third countersink through-hole with the third countersink depth in a third work to be fastened as the stacked composite material parts; and fastening the third work with a third fastener arranged in the third countersink through-hole.

5. The fastening method according to claim 1, wherein the first fastener comprises a first countersunk bolt, the second fastener comprises a second countersunk bolt, and the fastening of the second work comprises attaching a nut to the second countersunk bolt.

* * * * *